United States Patent [19]

Lampton, Jr. et al.

[11] Patent Number: 4,614,644
[45] Date of Patent: Sep. 30, 1986

[54] PROCESS FOR REMOVAL OF $H_2S$ FROM GEOTHERMAL STEAM AND THE CONVERSION TO SOLUBLE SULFUR COMPOUNDS

[75] Inventors: Robert D. Lampton, Jr.; Thomas M. Hopkins, II, both of Lake Jackson, Tex.

[73] Assignee: The Dow Chemical Company, Midland, Mich.

[21] Appl. No.: 776,062

[22] Filed: Sep. 13, 1985

[51] Int. Cl.$^4$ ................... C01B 17/05; B01D 53/54
[52] U.S. Cl. .................................. 423/226; 423/222; 423/DIG. 19
[58] Field of Search ............... 423/222, 226, DIG. 19

[56] References Cited

U.S. PATENT DOCUMENTS

| | | | |
|---|---|---|---|
| 3,363,989 | 1/1968 | Deal, Jr. et al. | 423/226 |
| 4,002,727 | 1/1977 | Sonada et al. | 423/226 |
| 4,451,442 | 5/1984 | Jeffrey et al. | 423/DIG. 19 |
| 4,483,843 | 11/1984 | Sonada et al. | 423/226 |

Primary Examiner—John Doll
Assistant Examiner—Lori S. Freeman
Attorney, Agent, or Firm—B. G. Colley

[57] ABSTRACT

A process for the removal of $H_2S$ from a fluid stream whereby the $H_2S$ is converted to soluble sulfur compounds by treatment with a solution of ferric chelates containing an oxidizing agent and a water soluble cationic polymeric catalyst such as poly(dimethyldiallyl ammonium chloride).

9 Claims, 1 Drawing Figure

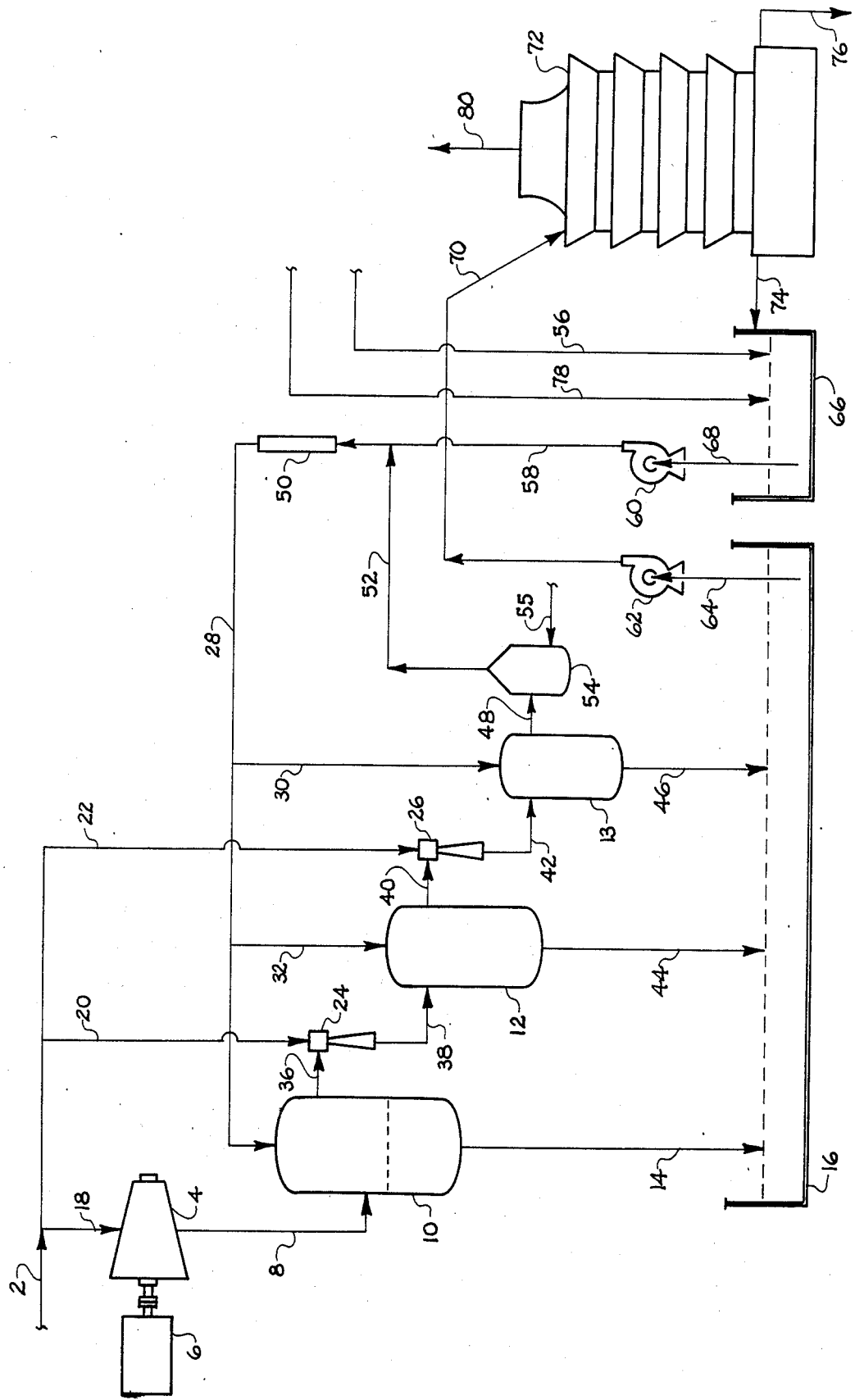

PROCESS FOR REMOVAL OF H₂S FROM GEOTHERMAL STEAM AND THE CONVERSION TO SOLUBLE SULFUR COMPOUNDS

BACKGROUND OF THE INVENTION

This invention relates to a process wherein a fluid stream containing hydrogen sulfide is contacted with an aqueous solution containing a polyvalent metal chelate and the hydrogen sulfide in said stream is converted to soluble sulfur compounds in a relatively short time.

It is known from U.S. Pat. No. 4,123,506 dated Oct. 31, 1978 and U.S. Pat. No. 4,202,864, dated May 13, 1980 that geothermal steam containing $H_2S$ can be purified by contacting the steam with a metal compound that forms insoluble metallic sulfides.

It is also known from U.S. Pat. No. 4,196,183, dated April 1, 1980 that geothermal steam containing $H_2S$ can be purified by adding oxygen and passing it through an activated carbon bed.

Various processes for hydrogen sulfide control in geothermal steam are outlined in the U.S. Department of Energy Report #DOE/EV-0068 (March 1980) by F. B. Stephens, et al.

U.S. Pat. No. 4,009,251 dated Feb. 22, 1977 discloses the removal of hydrogen sulfide from gaseous streams with metal chelates to form sulfur substantially without the formation of sulfur oxides.

U.S. Pat. No. 4,451,442 discloses a process for the removal of hydrogen sulfide from geothermal steam. This process generates free sulfur or sulfur solids which are then converted to soluble sulfur compounds.

SUMMARY OF THE INVENTION

The present invention is directed to a process wherein fluid streams containing $H_2S$ are purified by rapidly converting the $H_2S$ to soluble sulfur compounds by using a polyvalent metal chelate and a water soluble oxidizing agent in the presence of a polymeric catalyst.

The process of this invention has the following steps:

(A) contacting said $H_2S$ stream in a first reaction zone with an aqueous solution at a pH range suitable for removing $H_2S$ whereby said solution comprises (1) an effective amount of at least one ferric chelate, (2) an effective amount of an oxidizing agent capable of oxidizing elemental sulfur to soluble sulfur compounds, and (3) an effective amount of one or more water soluble cationic polymeric catalysts whereby the conversion of free sulfur to soluble sulfur compounds is accelerated by the presence of said catalysts and said ferric chelate is reduced to a ferrous chelate.

(B) Contacting said solution containing ferrous chelate in a second reaction zone with an oxygen containing gas stream whereby said chelate is reoxidized and (C) recirculating said reoxidized solution back to said first reaction zone.

Advantages of the process described herein are the rapid elimination of sulfur solids which foul piping, heat-exchanger surfaces, cooling tower basins and the like. Such fouling of equipment in geothermal power plants leads to costly down-time for maintenance and loss of power production.

BRIEF DESCRIPTION OF THE DRAWING

The figure of the drawing illustrates a process in which this invention is applied for the oxidation of hydrogen sulfide contained in a liquid stream produced by the condensation of geothermal steam.

In the drawing, the geothermal steam from line 2 is used to power a steam turbine 4 which is connected to an electric power generator 6. Branch lines 18, 20, and 22 directly supply steam from line 2 to the steam turbine 4, stream ejector 24, and steam ejector 26 respectively. The turbine 4 exhausts through line 8 to a direct contact condenser 10. Cooling water containing chelated iron (ferric chelate) from line 28 is sprayed into condenser 10 for this condensation and passes from the condenser 10 through line 14 to the hot well 16 operating at 100°–125° F. Non-condensable gases such as $CO_2$, $H_2$, $CH_4$, $N_2$, $O_2$, and part of the $H_2S$ are removed from the main condenser 10 through line 36 by two steam jet ejectors 24 and 26 and the associated condensers 12 and 13. The ejectors 24 and 26 are operated by steam supplied by lines 20 and 22 respectively. These ejectors create a partial vacuum or low pressure zone. The exhaust steam from the ejector 24 is carried by line 38 to the condenser 12 and by line 40 to the second ejector 26. The exhaust steam from ejector 26 is carried by line 42 to condenser 13. Cooling water from line 28 is supplied to each of the condensers 12 and 13 by lines 32 and 30 respectively. The condensed steam from condensers 12 and 13 flows by means of lines 44 and 46 to the hot well 16. The non-condensable gases including the remaining $H_2S$ and the exhaust steam are then fed through line 48 to an incinerator or $SO_2$ generator 54 for oxidation of the $H_2S$ to $SO_2$. An oxygen containing gas such as air, oxygen, or mixtures thereof is supplied to the generator 54 by line 55. The $SO_2$ generator 54 is a conventional catalytic incinerator, however, a thermal incinerator may be used if desired.

The $SO_2$ generated in the incinerator 54 is fed by line 52 to the cold water line 58 from the pump 60. The water and gaseous $SO_2$ are thoroughly mixed in an inline mixer 50. The water containing dissolved $SO_2$ is then fed to the condensors 10, 12, and 13 by lines 28, 32, and 30.

Sufficient amounts of iron chelate are added after start-up to the cold well 66 by line 56 to make up for the amounts lost by continuous blowdown through line 76. In a similar manner, caustic solutions such as aqueous sodium hydroxide are added by line 78 to the cold well 66 to adjust or maintain the pH of the recirculating solution within the desired range of 5 to 11 and preferably 7 to 9.

The aqueous solution in the cold well 66 is withdrawn by line 68 into pump 60 and pumped by line 58 to the static mixer 50 and thence to the condensors 10, 12, and 13.

The aqueous solution in the hot well 16 is withdrawn by line 64 into pump 62 and pumped through line 70 to the cooling tower 72 where the solution is sprayed into the tower and oxidized by air circulation. Line 76 is provided for continuous solution withdrawal. Line 74 is provided to allow the cooled solution to recycle back to the cold well 66. The cooling tower 72 is vented to the atmosphere at 80 with substantially no $H_2S$ being present.

DETAILED DESCRIPTION OF THE INVENTION

The iron chelates used herein are water soluble iron chelates.

The term "chelating agent" is well-known in the art. Chelating agents useful in preparing the ferric iron chelate of the present invention include those chelating or complexing agents which form a water-soluble chelate with iron. Representative of such chelating agents are the aminopolycarboxylic acids, including the salts thereof, nitrilotriacetic acid, N-hydroxyethyl aminodiacetic acid and the polyaminocarboxylic acids including ethylenediaminetetraacetic acid, N-hydroxyethylethylenediaminetriacetic acid, diethylenetriaminepentaacetic acid, cyclohexene diamine tetraacetic acid, triethylene tetraamine hexaacetic acid and the like; aminophosphonate acids such as ethylene diamine tetra(methylene phosphonic acid), aminotri(methylene phosphonic acid), diethylenetriamine penta(methylene phosphonic acid); phosphonate acids such as 1-hydroxy ethylidene-1,1-diphosphonic acid, 2-phosphono acetic acid, 2-phosphono propionic acid, and 1-phosphono ethane 1,2-dicarboxylic acid; polyhydroxy chelating agents such as monosaccharides and sugars (e.g., disaccharides such as sucrose, lactose and maltose), sugar acids (e.g., gluconic or glucoheptanoic acid); other polyhydric alcohols such as sorbitol and manitol; and the like. Of such chelating agents, the polyaminocarboxylic acids, particularly ethylenediaminetetraacetic and N-hydroxyethylethylenediaminetriacetic acids, are most advantageously employed in preparing the iron chelate used herein. Most preferably, the iron chelate is the chelate of ferric iron with a polyaminocarboxylic acid, with the most preferred polyaminocarboxylic acids being selected on the basis of the process conditions to be employed. Ethylenediaminetetraacetic acid and N-hydroxyethylethylenediaminetriacetic acid are generally particularly preferred.

The oxidizing agent used herein to oxidize elemental sulfur to soluble sulfur compounds is preferably sulfur dioxide which can be generated by oxidizing a side stream of hydrogen sulfide. Other oxidizing agents that can be used are the alkali metal salts of inorganic oxidizing acids such as perchloric, chloric, hypochlorous and permanganic acids.

Examples of useful cationic polymeric catalysts to be used in this invention are polyethyleneamines, poly(2-hydroxypropyl-1-N-methylammonium chloride) and the 1,1-dimethyl analogue, poly(N-dimethylaminomethyl)-acrylamide, poly(2-vinylimidazolinum bisulfate), poly(diallyldimethyl ammonium chloride) and poly(N-dimethyl aminopropyl)-methacrylamide. These cationic polymers are well known and are commercially available under various tradenames. See, for example, Commercial Organic Flocculants by J. Vostricil et al Noyes Data Corp. 1972 which is incorporated by reference herein. Other useful cationic catalysts are set forth in J. Macromal. Science - Chem A4 pages 1327–1417 (1970) which is also incorporated by reference herein.

For the purposes of this invention, a suitable pH range for the aqueous solution in the first reaction zone is 5.5 to 10.5. A more preferred range is 6.0 to 9.0 and the most preferred range is 7.0 to 8.0.

It has been found that the ferric chelate can be used in an effective amount which is generally at least two moles of ferric iron for each mole of $H_2S$ in the feed gas. A preferred mole ratio range is 2.2:1 to 2.4:1.

The oxidizing agent can be used in an effective amount greater than one mole of oxidizing agent per mole of $H_2S$ in the feed gas. The preferred range is 1.2:1 to 1.5:1.

The cationic polymer is used in small but effective amounts. It has been found that an effective amount is generally an amount greater than one part per million based on the weight of the condensate recycle stream. A preferred range is 10 to 25 parts per million. It is to be understood that greater amounts than these levels can be used, but they are uneconomical in that larger amounts have about the same effect as 10 ppm.

Detailed examples of the invention are given below for purposes of further illustrating the invention.

Control

At zero time, 1.075 g of 2000 ppm sulfide (as $Na_2S \cdot 9H_2O$) stock solution (0.00215 g $S^=$ or $6.7 \times 10^{-5}$ mole $S^=$) was added to 250 ml of geothermal condensate having a pH of about 8 and a temperature of 50° C. The condensate contained 30 ppm ferric iron (0.0075 g $Fe^{+3}$ or $1.39 \times 10^{-4}$ moles $Fe^{+3}$) as the ferric chelate of N-hydroxyethylethylene diamine triacetic acid. The sodium sulfide furnished sulfide ions and is a simulant for the addition of $H_2S$ to an iron chelate solution.

The geothermal condensate solution changed from yellow to orange with the addition of the sodium sulfide, then back to yellow and finally became cloudy-white as the sulfur particles precipitated. After three minutes, 0.013 gram ($1.03 \times 10^{-4}$ mole) of $Na_2SO_3$ was added to simulate the addition of base-absorbed sulfur dioxide as an oxidizing agent. The time required for clarification of the solution by visual inspection was noted. The above procedure was repeated five times and the average time for solution clarification was about 19 seconds.

EXAMPLES 1-6

The procedure of the control experiment was repeated with various water soluble cationic polymeric catalysts at various concentrations. The results are set forth in Table I.

EXAMPLES 7-12

The procedure of the control was repeated with various amounts of Agefloc WT-40. The results are set forth in Table II.

EXAMPLES 13-18

The procedure of the control was repeated with various amounts of derivatized PAPA polymer. The results are set forth in Table III.

TABLE I

| Example | Polymer | Polymer Amount (ppm) | Time for Clarification (sec) |
|---|---|---|---|
| Control | N.A. | N.A. | 19 |
| 1 | Agefloc WT-40(1) | 164 | 6 |
| 2 | Dowell M-181(2) | 195 | 8 |
| 3 | Nalco 8103(3) | 120 | 11 |
| 4 | Purifloc C-31(4) | 211 | 11 |
| 5 | Primafloc C-3(5) | 132 | 12 |
| 6 | Derivatized PAPA polymer | 188 | 14 |

TABLE I-continued

| Example | Polymer | Polymer Amount (ppm) | Time for Clarification (sec) |
|---|---|---|---|
| | (6) | | |

(1) poly(dimethyldiallyl ammonium chloride) from the CPS Chemical Company
(2) a blend of polyalkylene polyamine and polyethyleneimine of 20,000 molecular weight
(3) a cationic polyamine from the Nalco Chemical Company
(4) a cationic polyalkylene polyamine from the Dow Chemical Company
(5) a polyamine from Rohm and Haas
(6) a polyalkylene polyamine with 30 mol. percent of its functionality derivatized with 2-hydroxypropyltrimethyl ammonium chloride

TABLE II

| Example | Amount of Agefloc (ppm) | Time for Clarification (sec) |
|---|---|---|
| 7 | 1 | 13 |
| 8 | 5 | 12 |
| 9 | 10 | 10 |
| 10 | 25 | 10.5 |
| 11 | 50 | 9 |
| 12 | 100 | 6.5 |

TABLE III

| Example | Amount of Derivatized PAPA (ppm) | Time for Clarification (sec) |
|---|---|---|
| 13 | 1 | 11 |
| 14 | 5 | 8.6 |
| 15 | 10 | 8 |
| 16 | 25 | 6.6 |
| 17 | 50 | 6.5 |
| 18 | 100 | 6 |

Table I shows that the use of various cationic polymer catalysts can substantially reduce the time for clarification of the solution. This indicates that the free sulfur is being rapidly converted to sulfur compounds by the polymer catalysts.

Tables II and III illustrate the fact that with increasing amounts of the cationic polymers the decrease in time for clarification levels off.

We claim:

1. A process for removing $H_2S$ from a fluid stream containing $H_2S$ which comprises
(A) contacting said $H_2S$ stream in a first reaction zone with an aqueous solution at a pH range suitable for removing $H_2S$ whereby said solution comprises
  (1) at least one ferric chelate,
  (2) an oxidizing agent capable of oxidizing elemental sulfur to solutble sulfur compounds, and
  (3) one or more water soluble cationic polymeric catalysts
whereby the converstion of free sulfur to soluble sulfur compounds is accelerated by the presence of said catalysts and said ferric chelate is reduced to a ferrous chelate
(B) contacting said solution containing ferrous chelate in a second reaction zone with an oxygen containing gas stream whereby said chelate is reoxidized and
(C) recirculating said reoxidized solution back to said first reaction zone.

2. A process for removing $H_2S$ from a fluid stream containing $H_2S$ which comprises
(A) contacting said $H_2S$ stream in a first reaction zone with an aqueous solution at a pH range from 5.5 to 10.5 whereby said solution comprises
  (1) at least two moles of a ferric chelate per mole of $H_2S$,
  (2) at least one mole an oxidizing agent capable of oxidizing elemental sulfur to soluble sulfur compounds per mole of $H_2S$, and
  (3) greater than one part per million of one or more water soluble cationic polymeric catalysts
whereby the conversion of free sulfur to soluble sulfur compounds is accelerated by the presence of said catalysts and said ferric chelate is reduced to a ferrous chelate
(B) contacting said solution containing ferrous chelate in a second reaction zone with an oxygen containing gas stream whereby said chelate is reoxidized and
(C) recirculating said reoxidized solution back to said first reaction zone.

3. The process as set forth in claim 2 wherein said pH range is 6.0 to 9.0; the mole ratio range of said ferric chelate is 2.2:1 to 2.4:1; the mole ratio range of said oxidizing agent is 1.2:1 to 1.5:1; and the amount of said polymeric catalyst is 10 to 25 parts per million.

4. The process as set forth in claim 2 wherein said ferric chelate is the ferric chelate of polyaminocarboxylic acid.

5. The process as set forth in claim 2 wherein said oxidizing agent is sulfur dioxide.

6. The process as set forth in claim 2 where said cationic polymer is poly(dimethyldiallyl ammonium chloride).

7. The process as set forth in claim 2 wherein said ferric chelate has a chelating agent selected from the group consisting of nitrilotriacetic acid, N-hydroxyethyl aminodiacetic acid, ethylenediaminetetraacetic acid, N-hydroxyethylethylenediamine triacetic acid, diethylenetriaminepentaacetic acid, cyclohexene diamine tetraacetic acid, and triethylenetetraaminehexaacetic acid.

8. The process as set forth in claim 2 wherein said oxidizing agent is selected from the group consisting of sulfur dioxide, and the alkali metal salts of perchloric, chloric hypochlorous and permanganic acids.

9. The process as set forth in claim 2 wherein said polymeric catalyst is selected from the group consisting of polyethylene amines, poly(2-hydroxypropyl-1-N-methyl ammonium chloride), poly(2-hydroxypropyl-1,1-N-dimethyl ammonium chloride), poly(N-dimethylaminomethyl)-acrylamide, poly(2-vinylimidazolimum bisulfate), poly(diallyldimethyl ammonium chloride), and poly(N-dimethylaminopropyl)-methacrylamide.

* * * * *